Jan. 2, 1968  L. J. GOLDBERG  3,361,030
SYSTEM AND METHOD FOR DETECTING SMALL PARTICLES
Filed Sept. 21, 1961  2 Sheets-Sheet 2

LEONARD J. GOLDBERG
INVENTOR.

BY Nilsson & Robbins
ATTORNEYS

United States Patent Office 3,361,030
Patented Jan. 2, 1968

3,361,030
SYSTEM AND METHOD FOR DETECTING SMALL PARTICLES
Leonard J. Goldberg, 9 Boies Court, Pleasant Hill, Calif. 94523
Filed Sept. 21, 1961, Ser. No. 139,714
2 Claims. (Cl. 88—14)

This invention relates to forward light scattering, and more particularly to the systems and methods for detecting the presence of small particles, such as those of fog, dust, smog, or other impurities in a fluid such as air, or water.

In many fields of effort it is extremely important to monitor the presence of pollution or contamination in a media such as air for breathing or for cooling delicate, dirt sensitive equipment. For example, some computer systems become inoperable and damaged when even an exceedingly minute quantity of dust or moisture is permitted to enter certain of the computer components.

Precise monitoring of atmospheric pollution by smog near centers of population or by fog near air terminals or harbors has become a particularly acute need in recent years and will continue to be in ever greater need as, in these examples respectively, population in such centers increases and larger and faster airplanes are developed. In laboratories, hospitals, and factories monitoring of the pollution of air or of other fluids can frequently provide the earliest possible warning of danger to persons, products, or equipment due to the malfunction of filters or other equipment.

A number of efforts in the past have been directed toward detecting particles in a transparent medium by projecting a beam of light through the medium and observing that portion of the light which is scattered out of the beam from the surfaces of the particles. It has long been known that on the average the greatest intensity of such scattered light is directed forwardly with respect to the direction of the beam, and hence for the strongest scattering signal the observer or detector should look substantially into the beam of light toward its source. Obviously, this scattering signal must, to be effective, be separated from any background "noise."

Prior art forward light scattering systems have typically removed a major centrally directed portion of the beam before its peripheral converging portion impinges on the scattering particles and diverges again. A conical, central portion of the forwardly scattered light is then focused upon a suitable detector. In such systems, a portion of the light reflected from the central light stop also enters the detecting system and generates a "noise" background. This results in a reduction in sensitivity. In addition, one is required to carefully maintain the lens and light stop systems clear of any reflective dirt specks, with the requirement of re-calibration after each required cleaning procedure.

It is therefore an object of the present invention to provide a forward scattering method and photometer system for detecting particles which are not subject to these and other disadvantages of the prior art.

It is another object to provide such an optical arrangement which, in its inherent design, lends itself to a stable high signal to noise ratio.

It is another object to provide such an optical system which is rugged and simple in its construction and which is not subject to critical alignment requirements.

These and other objects are achieved in a typical embodiment of the present invention as follows:

A first lens within a housing and support member images the filament of a light source in the plane of a scattering chamber diaphragm. This lens is placed transversely to and coaxially with the path of the light beam from the light source. The light source is placed at a distance of approximately $2f$ from the first lens, where $f$ designates the focal length of the lens. As a result, the image of the filament is the same size as the filament itself, and is formed at the symmetric distance of $2f$ from this lens oppositely from the filament along the axis of the housing. The image of the light source is focused in the center of the opening of the scattering chamber diaphragm. The opening of this diaphragm is just sufficient to provide a clear field about the filament image formed by the lens. Other apertured light baffles are positioned on either side of the lens to contain the light beam in such a manner as to minimize any spurious light from reaching the surfaces of a second lens which is disposed at a distance slightly greater than its focal length F from the diaphragm.

The second lens, in this example, has a conical light trap mounted in an axially central opening formed in this second lens. The conical light trap is coaxial with the central axis of the housing and the lenses, and its conical apex is directed downstream with respect to the light beam to form a light trap for the axially centered intense beam of light formed by the first lens.

The diaphragm and conical light trap are constructed so that the lens portion of the second, apertured lens can only "see" the dark unlighted section of the back or downstream sides of the baffles for containing the central light beam. The conical light trap in the central, relieved portion of the second lens is so dimensioned as to collect any direct light focused by the first lens and any light scattered from dust on the surface of the first lens. The second lens collects light scattered from particles as they pass through the light beam in the scattered chamber between the diaphragm and second lens, and focuses such scattered light onto a photomultiplier detector. A final diaphragm is placed in front of the photomultiplier and has an aperture just large enough to receive the focused light scattered from particles traversing the central intense light beam in the scattering region between the diaphragm and the second lens. Some light scattered by the aperture edge of the scattering chamber diaphragm is also collected and imaged in the plane of the final diaphragm placed in front of the photomultiplier. This image, however, is formed concentric to the aperture of the final diaphragm, and the aperture image is enlarged greater in diameter than the final diaphragm opening. Hence the photomultiplier is shielded from the light scattered or reflected from the scattering chamber diaphragm. In fact, the photomultiplier sees only an image of the central opening or void in the scattering chamber diaphragm. Since such a void has no surfaces to collect and store dust particles and the like, it remains clean by its very nature and the optical system achieves a long term stability in its low sensitivity to dust or film contamination.

Further description of these and other novel features of the invention and of its operation, and of additional embodiments, will be presented below in connection with a discussion of the accompanying drawings, in which:

FIG. 5 is a partially sectioned view of a portion of a further embodiment of the invention.

Referring more specifically to the figures, there is shown by way of example only a number of specific embodiments and details. The particular showing is chosen and presented for the purposes of clarity and a ready understanding of the invention, and is not intended to be taken as any limitation of the scope of the invention.

The scope of coverage of the invention is to be measured only by the terms of the appended claims.

Figure 1:
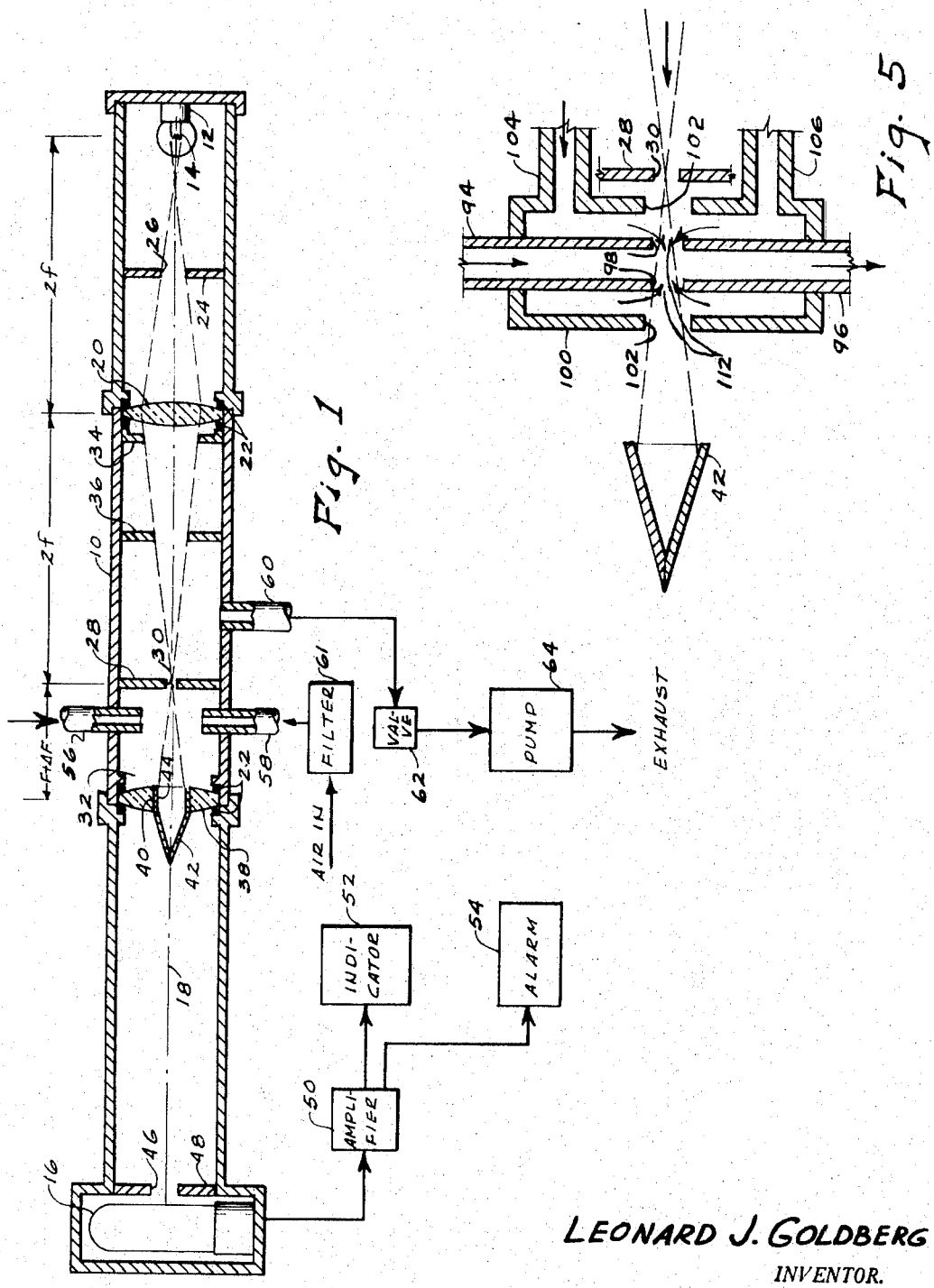
FIG. 1 is a simplified sectional and schematic diagram of the structure of one embodiment of the invention.

In FIG. 1 an elongated housing 10 is shown which includes at its right hand end in the drawing a support for a light source 12 which includes a small area filament 14. A photomultiplier light detector 16 is shown supported at the left hand end of the housing 10. Both the small area filament 14 and the light sensitive portion of the detector 16 lie on an axis 18 which is substantially the center line of the housing 10.

Disposed symmetrically about the axis 18 and spaced to the left in the drawing of the light source 12 is a double convex lens 20 which has a focal length $f$. The lens 20 is disposed transversely to the axis 18 and is spaced from the filament 14 of the light source 12 by a distance of approximately $2f$. The double convex lens 20 may be supported by the housing 10 and cushioned by a pair of rubber O-rings 22. Approximately midway between the filament 14 and the lens 20 is disposed an iris 24 which has an aperture 26 disposed symmetrically about the axis 18 for minimizing the illumination of the peripheral portions of the lens 20 by the light emitted from the filament 14. Disposed at a distance substantially equal to $2f$ downstream, that is, in a direction increasing in distance from the light source 12, from the double convex lens 20 is another iris 28 having an aperture 30 therein disposed symmetrically about the axis 18. Thus, the image of the filament 14 falls in the plane of aperture 30, and is the same size as the filament. The diameter of the aperture 30 is slightly larger, for example twice as large, as the image of the filament 14 at that point so that substantially the full intensity of the light emitted by the filament 14 and striking the double convex lens 20 will be projected through the aperture 30 of the iris 28 and into a scattering chamber 32. A third iris 34 is shown disposed to the downstream side of the double convex lens 20 to absorb any light which may be transmitted by the peripheral portions of the double convex lens 20. A further iris 36 is disposed approximately midway between the irises 28, 34 to aid in the further containment of the beam of light as well as to absorb any spurious light which may be reflected from other components of the system.

On the downstream side of the iris 28 is shown a scattered light detecting lens 38 which has a central aperture 40 relieved therefrom. The focal length of the detecting lens 38 is designated F. The detecting lens 38 is axially spaced from the iris 28 by a distance of $F+\Delta F$ where $\Delta F$ indicates a small fraction of F, thus providing for an enlarged image of the aperture 30 in the plane of a final iris 48 (see below).

A light trap 42 is supported by and positioned within the central aperture 40 of the detecting lens 38. The conical surfaces of the light trap 42 converge downstream so that the apex of the cone lies near the axis 18 downstream from the scattering chamber 32. The light trap 42 need not be a mathematical cone. It may be truncated or it may have other converging surfaces such that light reflected from the surfaces will be re-reflected a number of times away from the scattering chamber 32. As will be discussed more fully in connection with FIG. 2, the diameter of the aperture 40 and the diameter of the effective base 44 of the conical light trap 42 is adequately large to intercept and collect the direct light beam from the source 12 which passes through the aperture 30 of the iris 28.

Light which is forwardly scattered by particles in the scattering chamber 32 is focused by the scattered light detecting lens 38 in such a manner as to pass through an aperture 46 in the iris 48 near the light detector 16. Any light which is scattered or re-reflected from the boundary of the aperture 30 and which passes through the detecting lens 38 will impinge upon the iris 48 radially externally of the aperture 46. Thus, light which is scattered in the scattering chamber 32 and impinges upon the detecting lens 38 is focused upon the light sensitive element of the photomultiplier light detector 16 and a resulting electrical signal is fed from the detector 16 to an amplifier 50. The output terminals of the amplifier 50 are in turn coupled to an indicator 52 as for monitoring the amount of scattering by particles in the scattering chamber 32 and to an alarm system 54 so that when a certain scattering level is obtained an audible or visual alarm signal may occur as a warning of a corresponding level of pollution of the fluid being tested or monitored.

The fluid being monitored, which may be any transparent fluid, such as air or water or other chemicals, is passed through an input duct 56 into the scattering chamber 32. The fluid is passed through the region of a scattering cone (see FIG. 2) which is contiguous to the iris 28 and is drawn out of the scattering chamber through an output duct 60. Alternatively, the fluid being monitored may be drawn through the scattering cone from inlet 58 and through the aperture 30 in the iris 28 and out of the housing 10 through an input duct 60. Duct 58, however, may be provided with a filter 61 to provide a null reading for calibration purposes. An exhaust pump 64 pulls the fluid through the scattering chamber 32, through the diaphragm 20, then through valve 62, and into an exhaust system (not shown).

The entire interior of the housing 10 including all of the irises, aperture edges and ducts, but excluding the lens surfaces, are coated with a complete layer of light absorbing material such as black photographic paint, oxidized copper, black anodized aluminum, or the like.

Figure 2:
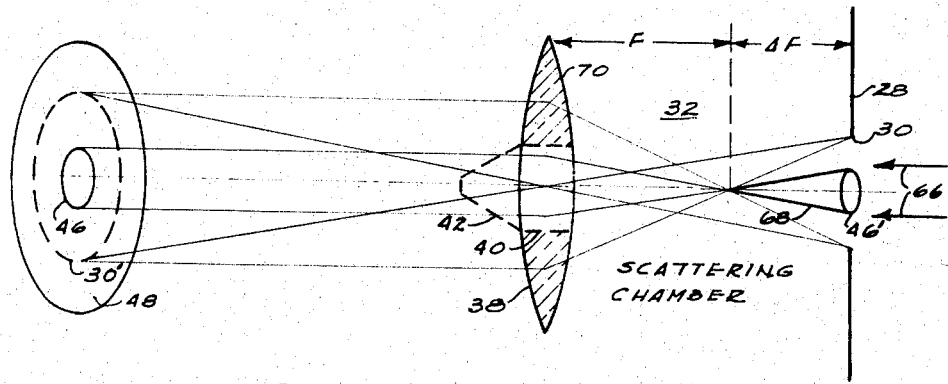
FIG. 2 is a schematic diagram of a portion of the structure of FIG. 1 for illustrating principles of design and operation.

Referring to FIG. 2, a portion of the structure of FIG. 1, namely, the scattering chamber 32 and the iris 48, is shown in schematic detail. The beam of direct light 66 from the light source 12 is shown entering the scattering chamber 32 through the aperture 30 of the iris 28. This beam 66 is then collected or absorbed by the conical light trap 42 which is disposed radially within the aperture 40 of the lens 38, as discussed in connection with FIGURE 1. Thus, it is apparent that no significant portion of the direct beam 66 can impinge upon the aperture 46 of the iris 48 and cause spurious signals to enter the photomultiplier detector. It is also apparent that no portion of the direct beam 66 ever impinges upon the upstream surface 70 of the lens 38 and that therefore, even if this surface of the lens becomes dirty as by dust particles, they will not be appreciably illuminated and will not cause spurious, scattered light to reach the aperture 46. Another possible source of spurious light is the edge of the aperture 30 which may be illuminated by re-reflected light. The image of the aperture 30 has been constructed by lightweight lines in the figure and shown as an image 30' on the iris 48. It is shown clearly that the image 30' lies radially outside of the aperture 46, and that any light originating at the rim of aperture 30 will strike the solid portion of iris 48, and will not enter the detector 16. The image of the aperture 46 has been constructed by lightweight lines in the figure in the plane of the iris 28 and is designated as an image 46'. It is evident from geometric optics that only points within the scattering cone 68 defined by the circle image 46' and the focal point of the detecting lens 38 will be imaged radially within the aperture 46 of the iris 48. Hence, only light emanating from this scattering cone 68, as from a light scattering particle illuminated by direct beam 66, will be focused by the lens 38 through the aperture 46, and hence be detected by the light detector 16. Conversely, any light passing through the aperture 46 and coming from the lens 38 must emanate from the confines of the scattering cone 68. It may be seen that, in the absence of light-scattering particles, the "background" of the scattering cone 68 as seen through the lens by the aperture 46 is the hole or void of the aperture 30 which is inherently clean and cannot be the source of any scattered or reflected light other than molecular scattering, and the blackened surface of wall 10 and the baffles. Hence, the system provides the strongest possible forward scattered light signal from a scattering cone which is illuminated directly by the main central beam from the light source. Simultaneously, the background noise from spurious light is substantially zero because of the clean apertures and the blackened irises and baffled chambers beyond. Thus, my invention provides and optimum signal-to-noise ratio. Molecular scattering has in fact been detected with the described system, thus illustrating the extremely low noise in the system.

It is preferable that lens 38 be apertured. If it were not, my invention would still operate as described above, except that light reflected from the central portion of lens 38 might produce some background noise.

It should be noted that any dirt, dust, or particles on the surfaces of double convex lens 20 scatters light that is absorbed by the walls or irises, and so does not produce any background noise, or else contributes to the direct beam of light that illuminates particles in the fluid. Any dirt, dust, or particles on the peripheral surface of detector lens 38 is not illuminated; and thus cannot produce spurious or background signals. Thus, my arrangement is such that its optical efficiency is very high.

Figure 3:
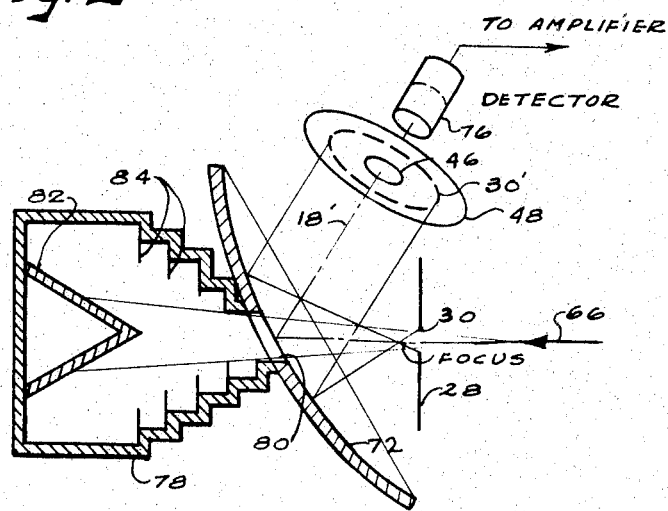
FIG. 3 and FIG. 4 are schematic diagrams of portions of alternative embodiments.

Referring to FIG. 3, there is shown an embodiment of the invention in which the axis 18–18' of the system is effectively folded by an elliptical mirror 72. The mirror 72 is inclined with respect to the direction of the light beam 66 and so that a focus of the elliptical mirror lies on the axis 18 near the iris 28. The reflective surface of the mirror 72 directs the light scattered from the scattering cone near the iris 28 toward the iris 48. Again, the image 30' of the aperture 30 is disposed radially outwardly from the aperture 46 of the iris 48; and light scattered from the scattering cone is focused through the aperture 46 into the detector 76. It may be noted that as with the embodiment discussed in connection with FIG. 1 and FIG. 2, any dust particles on the front surface of the elliptical mirror 72 will not be illuminated by the beam 66 and hence will not cause any spurious light to be scattered therefrom into the aperture 46. Unlike the previous embodiment, however, the space behind the mirror 72 is not radially limited and a light trap 78 may be provided with more elaborate baffling. The light beam 66 in this example enters the light trap through an aperture 80 in the central portion of the mirror 72 and progresses to the left in the figure until it impinges upon a conical absorbing member 82. Any of the light beam which is not absorbed by the member 82 will be reflected or re-reflected against the absorbing baffles 84 until it is fully absorbed. Thus, the re-entry of any such light into the scattering chamber where it would be spurious and possibly deleterious is substantially precluded. In the cause of clarity, other components of the system are not repeated in FIG. 3. They are effectively the same as those discussed in connection with the previous figures. It is to be noted that all the advantages of the previously discussed embodiments are retained by the embodiment of FIG. 3 and that in addition, because of the folded axis, 18–18', the entire system may be considerably shorter and, in many applications, less bulky and therefore more practicable in some utilizations.

Figure 4:
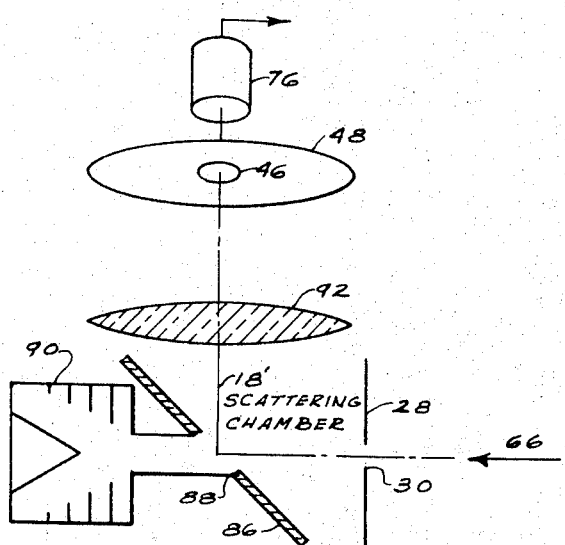

In FIG. 4 there is shown an alternative embodiment similar in some respects to that described in connection with FIG. 3. Here again, the axis 18–18' of the system is folded by a mirrored surface. In this example, however, the mirrored surface is a plane mirror 86 inclined on an angle of approximately 45° with respect to the direction of the beam 66 and having an aperture 88 therein for permitting the passage therethrough of the beam 66 into a light trap 90. A lens 92 having substantially spherical surfaces is disposed perpendicularly to the folded axis 18' and functions substantially similarly to lens 38 of FIG. 1 to focus the forward scattered light in the scattering chamber through an aperture 46 in an iris 48 and into a detector 76. Again, the focal point of the lens 92 is on the axis 18 spaced at a short distance downstream from the iris 28. The aperture 30 of the iris 28 again is imaged radially outside of the aperture 46 of the iris 48.

In FIG. 5 there is illustrated a portion of an embodiment of the invention in which means are provided for passing the fluid to be monitored through the scattering cone in the scattering chamber without permitting the fluid or its pollutants to come in contact with other components of the system. As in FIG. 1, the light beam passes through the aperture 30 in the iris 28 through the scattering cone on the downstream side of the iris 28 and into a light trap 42 which is disposed radially within a scattered light detecting lens (not shown in this figure). The fluid and the particles enter the system through an input duct 94 and leave through an output duct 96. A pair of light apertures in opposite sides of the otherwise continuous duct 94, 96 are aligned to permit the passage of the light beam therethrough. Solid windows could be disposed over the openings 98 to preclude the escape of the fluid into the remainder of the system, but such windows would be directly illuminated by the light beam and would cause spuriously scattered light which would provide a deleterious background noise. This embodiment of the invention provides a jacket 100 which surrounds the ducts 94, 96 in the region of the scattering chamber and is also apertured by a pair of openings 112 to permit the passage of the light beam therethrough. Filtered fluid is supplied to the interior of the jacket 100 at a slight pressure with respect to that of the fluid in the duct 94, 96 through a jacket input duct 104. A second similar duct 106 may be provided as shown.

In operation, the filtered fluid under pressure flows from the jacket 100 into the duct 94, 96 through the openings 98 therein to thereby force the containment of the polluted fluid within the ducts 94, 96. The fluid output of the output duct 96 is accordingly a mixture of the filtered fluids and the polluted fluid. Alternatively a concentric annular jacket of "sheath" fluid may be provided by the jacket 100. In such a mode of operation, air is circulated through a pump-filter unit and through the inlet 104 and the duct 106, functioning as an outlet, to establish an air sheath in the regions 112. The axial light beam is focused so as completely and uniformly to illuminate the cross section of the sheathed air projected from the tube 94. The air velocity of the sheath 100 is adjusted to the air velocity in duct 94. Thus turbulence at the interface is minimized. Each particle, in passing through the central focused light beam will generate a discrete pulse of scattered light, if the illuminated volume contains one particle during any measured time period. This arrangement is suitable for particles size analysis since particle size is functionally related to the energy in the scattered light pulse. The remaining details of the embodiment of FIG. 5 are substantially similar in all important respects to those shown and described in connection with the previous figures.

There have thus been described a number of embodiments and detailed features of the invention which provide a forward scattering photometer and method having an exceedingly high signal-to-noise ratio and many other advantages such as simplicity of construction and operation and freedom from stringent cleaning requirements in the scattering chamber or other components.

What is claimed is:

1. A forward light scattering photometer comprising an effectively small area source of light for producing a beam of light along an axial path, a first substantially spherical lens disposed coaxially with said path at a distance of twice its focal length from said source, a first iris interposed approximately midway between said lens and said source having an aperture of less than approximately half that of said lens for precluding the illumination of the peripheral portions of said lens by said beam, a second iris disposed coaxially about said path downstream from said lens at a first point spaced a distance therefrom of approximately twice its focal length and having an aperture larger than the image at said point of said source and smaller than the image at said point of the aperture of said first iris, at least one additional iris disposed coaxially about said path between said lens and said second iris and each having an aperture adapted to contain said beam, a substantially conical absorbing light trap for collecting said beam and having a base at a second point axially spaced downstream from said second iris and disposed coaxially with said path and with its apex downstream, the diameter of said base being at least as large as that of said stream at said second point, a centrally apertured second lens having a second focal length and disposed coaxially and radially contiguously to and about said light trap and spaced downstream from said second iris by a distance greater than said second focal distance by a small fraction thereof, a third iris disposed at a third point along and coaxially with said path effectively downstream from said second lens and having an aperture in the shadow of said light trap and radially within the image at said third point of the aperture of said second iris, a forward scattered light detector disposed downstream from said third iris and adapted to detect light passing through the aperture thereof, and means for introducing a fluid substance to be examined into the chamber defined between said light trap and said second iris.

2. A forward light scattering photometer comprising an effectively small area source of light for producing a beam of light along an axial path, a first substantially spherical lens disposed coaxially with said path at a distnce of twice its focal length from said source, a first iris interposed approximately midway between said lens and said source having an aperture of less than approximately half that of said lens for precluding the illumination of the peripheral portions of said lens by said beam, a second iris disposed coaxially about said path downstream from said lens at a first point spaced a distance therefrom of approximately twice its focal length and having an aperture larger than the image at said point of said source and smaller than the image at said point of the aperture of said first iris, at least one additional iris disposed coaxially about said path between said lens and said second iris and each having an aperture adapted to contain said beam, an absorbing light trap disposed at a second point axially spaced downstream from said second iris and coaxially with said path, a centrally apertured second lens having a second focal length and disposed coaxially and radially contiguous to and about light trap and spaced downstream from said second iris by a distance greater than said second focal distance by a small fraction thereof, a third iris disposed at a third point along and coaxially with said path effectively downstream from said second lens and having an aperture in the shadow of said light trap and radially within the image at said third point of the aperture of said second iris, a forward scattered light detector disposed downstream from said third iris and adapted to detect light passing through the aperture thereof, and means for introducing a fluid substances to be examined into the chamber defined between said light trap and said second iris.

References Cited
UNITED STATES PATENTS

| | | | |
|---|---|---|---|
| 2,451,501 | 10/1948 | Liben | 88—14 |
| 2,764,692 | 9/1956 | Miller | 88—14 |
| 2,858,727 | 11/1958 | Stamm et al. | 88—14 |
| 3,039,355 | 6/1962 | Suter | 88—14 |

FOREIGN PATENTS 396,390    8/1933    Great Britain.

JEWELL H. PEDERSEN, *Primary Examiner.*

E. S. ANDERSON, *Examiner.*

T. L. HUDSON, C. E. QUARTON, *Assistant Examiners.*